(12) United States Patent
Ogawa et al.

(10) Patent No.: US 8,505,670 B2
(45) Date of Patent: Aug. 13, 2013

(54) AIRBAG JACKET ACTIVATING SYSTEM (75) Inventors: Sumitaka Ogawa, Saitama (JP);
Hiroyuki Kojima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 160 days.

(21) Appl. No.: 13/051,005

(22) Filed: Mar. 18, 2011

(65) Prior Publication Data

US 2011/0233906 A1 Sep. 29, 2011

(30) Foreign Application Priority Data

Mar. 23, 2010 (JP) .................................. 2010-066119

(51) Int. Cl.
*B60R 21/16* (2006.01)
*B60R 21/36* (2011.01)

(52) U.S. Cl.
USPC .......................... 180/274; 280/735; 280/730.1

(58) Field of Classification Search
USPC ................................. 180/274; 280/735, 730.1
See application file for complete search history.

(56) References Cited

U.S. PATENT DOCUMENTS

| | | | |
|---|---|---|---|
| 6,714,847 B2* | 3/2004 | Ota .................................. | 701/46 |
| 6,783,153 B2* | 8/2004 | Mattes ............................ | 280/735 |
| 6,908,103 B2* | 6/2005 | Umeda et al. ................ | 280/730.1 |
| 7,445,235 B2* | 11/2008 | Makabe et al. ................ | 280/735 |
| 7,543,846 B2* | 6/2009 | Makabe et al. ............ | 280/730.1 |
| 7,658,256 B2* | 2/2010 | Kobayashi ..................... | 180/274 |
| 7,740,272 B2* | 6/2010 | Goto et al. ..................... | 280/735 |
| 7,997,613 B2* | 8/2011 | Kobayashi et al. ........... | 280/735 |
| 2002/0113417 A1* | 8/2002 | Mattes ........................ | 280/730.1 |
| 2007/0075528 A1* | 4/2007 | Makabe et al. ............ | 280/730.1 |
| 2008/0238056 A1* | 10/2008 | Kobayashi et al. ........... | 280/735 |
| 2009/0055053 A1* | 2/2009 | Carmeli .......................... | 701/45 |
| 2009/0127835 A1* | 5/2009 | Lin ............................ | 280/730.1 |
| 2011/0237194 A1* | 9/2011 | Kojima et al. ................ | 455/41.3 |

FOREIGN PATENT DOCUMENTS

JP 2002-285408 A 10/2002

* cited by examiner

*Primary Examiner* — Nicole Verley
(74) *Attorney, Agent, or Firm* — Birch, Stewart, Kolasch & Birch, LLP (57) ABSTRACT

A human body communications transmitter is provided to a vehicle body, for transmitting an activation signal by using the human body of a rider as a transmission path on the basis of an instruction from an on-vehicle ECU. A human body communications receiver is provided to an airbag jacket for receiving the activation signal which is transmitted by using the human body of the rider as the transmission path. The in-jacket ECU inflates and thus deploys the airbag jacket upon receipt of the activation signal for the airbag jacket through either human body communications or radio communications. The human body communications transmitter is connected to a right handlebar portion electrode, a left handlebar portion electrode, a seat portion electrode, a right footrest portion electrode and a left footrest portion electrode. The human body communications receiver is connected to an in-jacket electrode adjacent to the human body.

20 Claims, 7 Drawing Sheets

AIRBAG JACKET ACTIVATING SYSTEM

CROSS-REFERENCE TO RELATED APPLICATIONS

The present application claims priority under 35 USC 119 to Japanese Patent Application No. 2010-066119 filed on Mar. 23, 2010 the entire contents of which are hereby incorporated by reference.

BACKGROUND OF THE INVENTION

1. Field of the Invention

The present invention relates to an airbag jacket activating system. More particularly, to an airbag jacket activating system configured to detect the application of an external force which exceeds a predetermined value to a vehicle body and to transmit an activation signal to an airbag jacket.

2. Description of Background Art

Airbag jackets are known that include inflation air chambers for reducing an injury of a rider of a motorcycle or the like. Methods of detecting a condition for activating the airbag jacket include a method of detecting the separation of a rider from a vehicle body when a string-shaped body or the like connecting the vehicle body and the jacket is tugged and a method of detecting the application of an external force which exceeds a predetermined value to the vehicle body by use of an acceleration sensor and the like provided in the vehicle body.

Japanese Patent Application Publication No. 2002-285408 discloses an airbag jacket activating system wherein a vehicle body and an airbag jacket are each provided with radio communications means. Once an acceleration sensor provided in the vehicle body detects the application of an external force which exceeds a predetermined value to the vehicle body, an activation signal is transmitted from the vehicle body to the airbag jacket by radio and the airbag jackets is inflated and thus deployed by receiving this activation signal.

However, the technique disclosed in Japanese Patent Application Publication No. 2002-285408 entails the likelihood that an airbag jacket activation signal may be unable to be transmitted and received stably under an environment in which, for example, the communications condition is unsuitable for radio communications because an electric field strength is too strong.

SUMMARY AND OBJECTS OF THE INVENTION

An object of an embodiment of the present invention is to provide an airbag jacket activating system capable of solving the above-mentioned problem with the prior art, eliminating a wire between a vehicle body and an airbag jacket by employing radio communications and transmitting an activation signal effectively even under an environment in which the communications condition is unsuitable for radio communications.

For the purpose of achieving the above mentioned object, an embodiment of the present invention provides an airbag jacket activating system including an acceleration sensor (15, 16, 17), an on-vehicle ECU (21), and an on-vehicle radio communications instrument (24) which are provided in a vehicle body (1). In addition, an in-jacket radio communications instrument (45) and an in-jacket ECU (40) are provided in an airbag jacket (30). The acceleration sensor (15, 16, 17) is configured to detect acceleration applied to the vehicle body (1). The on-vehicle ECU (21) is configured to output an activation signal for the airbag jacket (30) on a basis of an output signal from the acceleration sensor (15, 16, 17). The on-vehicle radio communications instrument (24) is configured to transmit the activation signal through radio communications on a basis of the output signal from the on-vehicle ECU (21). The in-jacket radio communications instrument (45) is configured to receive the activation signal through radio communications. The in jacket ECU (40) is configured to inflate and thus deploy the airbag jacket (30) on a basis of the activation signal. The airbag jacket activating system includes the airbag jacket activating system having a human body communications transmitter (37), provided to the vehicle body (1), for transmitting the activation signal by using the human body of a rider (M) as a transmission path on a basis of an instruction from the on-vehicle ECU (21) with a human body communications receiver (47), provided to the airbag jacket (30), for receiving the activation signal which is transmitted by using the human body of the rider (M) as the transmission path. The in-jacket ECU (40) is configured to inflate and thus deploy the airbag jacket (30) upon receipt of the activation signal through any one of the human body communications and the radio communications.

According to an embodiment of the present invention, the human body communications transmitter (37) is connected to an on-vehicle electrode (18, 19, 20, 28, 29) for giving an electric field signal to the human body of the rider (M), and the human body communications receiver (47) is connected to an in-jacket electrode (46) for detecting the electric field signal which is given to the human body of the rider (M) by the human body communications transmitter (37).

According to an embodiment of the present invention, the human body communications transmitter (37) is attached to a vehicle body of a motorcycle (1), and the on-vehicle electrode (19, 20) is provided to left and right handlebar grip portions at which a handlebar (8) of the vehicle body is gripped.

According to an embodiment of the present invention, the human body communications transmitter (37) is attached to the vehicle body of the motorcycle (1), and the on-vehicle electrode (18) is provided to a seat (14) of the vehicle body.

According to an embodiment of the present invention, the human body communications transmitter (37) is attached to the vehicle body of the motorcycle (1), and the on-vehicle electrode (28, 29) is provided to a footrest portion (27) of the vehicle body.

According to an embodiment of the present invention, the human body communications receiver (47) and the in-jacket electrode (46) are formed integrally, and the human body communications receiver (47) is attached to the airbag jacket (30) so that the in-jacket electrode (46) is situated close to the human body of the rider (M).

According to an embodiment of the present invention, the human body communications transmitter, provided to the vehicle body, for transmitting the activation signal by using the human body of the rider as the transmission path on a basis of an instruction from the on-vehicle ECU; and the human body communications receiver, provided to the airbag jacket, for receiving the activation signal which is transmitted by using the human body of the rider as the transmission path are included and the in-jacket ECU is configured to inflate and thus deploy the airbag jacket upon receipt of the activation signal through any one of the human body communications and the radio communications. Thus, the wire between the vehicle body and the airbag jacket becomes no longer necessary, because the airbag jacket activation signal is transmitted through the radio communications. In addition, even under an environment in which the communications condition is unsuitable for the radio communications, the airbag jacket can be activated effectively through the human body communications.

According to an embodiment of the present invention, the human body communications transmitter is connected to the on-vehicle electrode for giving an electric field signal to the human body of the rider, and the human body communications receiver is connected to the in electrode for detecting the electric field signal which is given to the human body of the rider by the human body communications transmitter. Thus, the airbag jacket can be activated by effectively performing the human body communications using the human body as the transmission path with the electrodes provided to the vehicle body and the jacket.

According to an embodiment of the present invention, the human body communications transmitter is attached to the vehicle body of the motorcycle, and the on-vehicle electrode is provided to the left and right handlebar grip portions at which a handlebar of the vehicle body is gripped. Because a motorcycle rider usually holds at least one of the left and right handlebar grips while travelling, the on-vehicle electrodes and the rider's human body are highly likely to be in contact with each other when the condition for activating the airbag jacket is satisfied. Accordingly, the use of the human body communications makes it possible to enhance the reliability in the activation of the airbag jacket.

According to an embodiment of the present invention, the human body communications transmitter is attached to the vehicle body of the motorcycle, and the on-vehicle electrode is provided to the seat of the vehicle body. Because a motorcycle rider is usually seated on the seat while travelling, the on-vehicle electrodes and the rider's human body are highly likely to be in contact with each other when the condition for activating the airbag jacket is satisfied. Accordingly, the use of the human body communications makes it possible to enhance the reliability in the activation of the airbag jacket.

According to the fifth feature, the human body communications transmitter is attached to the vehicle body of the motorcycle, and the on-vehicle electrode is provided to the footrest portion of the vehicle body. Because a motorcycle rider usually puts the feet on the respective footrests while travelling, the on-vehicle electrodes and the rider's human body are highly likely to be in contact with each other when the condition for activating the airbag jacket is satisfied. Accordingly, the use of the human body communications makes it possible to enhance the reliability in the activation of the airbag jacket.

According to an embodiment of the present invention, the human body communications receiver and the in-jacket electrode are formed integrally, and the human body communications receiver is attached to the airbag jacket so that the in-jacket electrode is situated close to the human body of the rider. This configuration can achieve a compact construction of the airbag jacket by saving the installation space in comparison with a configuration in which the human body communications receiver and the in-jacket electrode are disposed separately and discretely.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
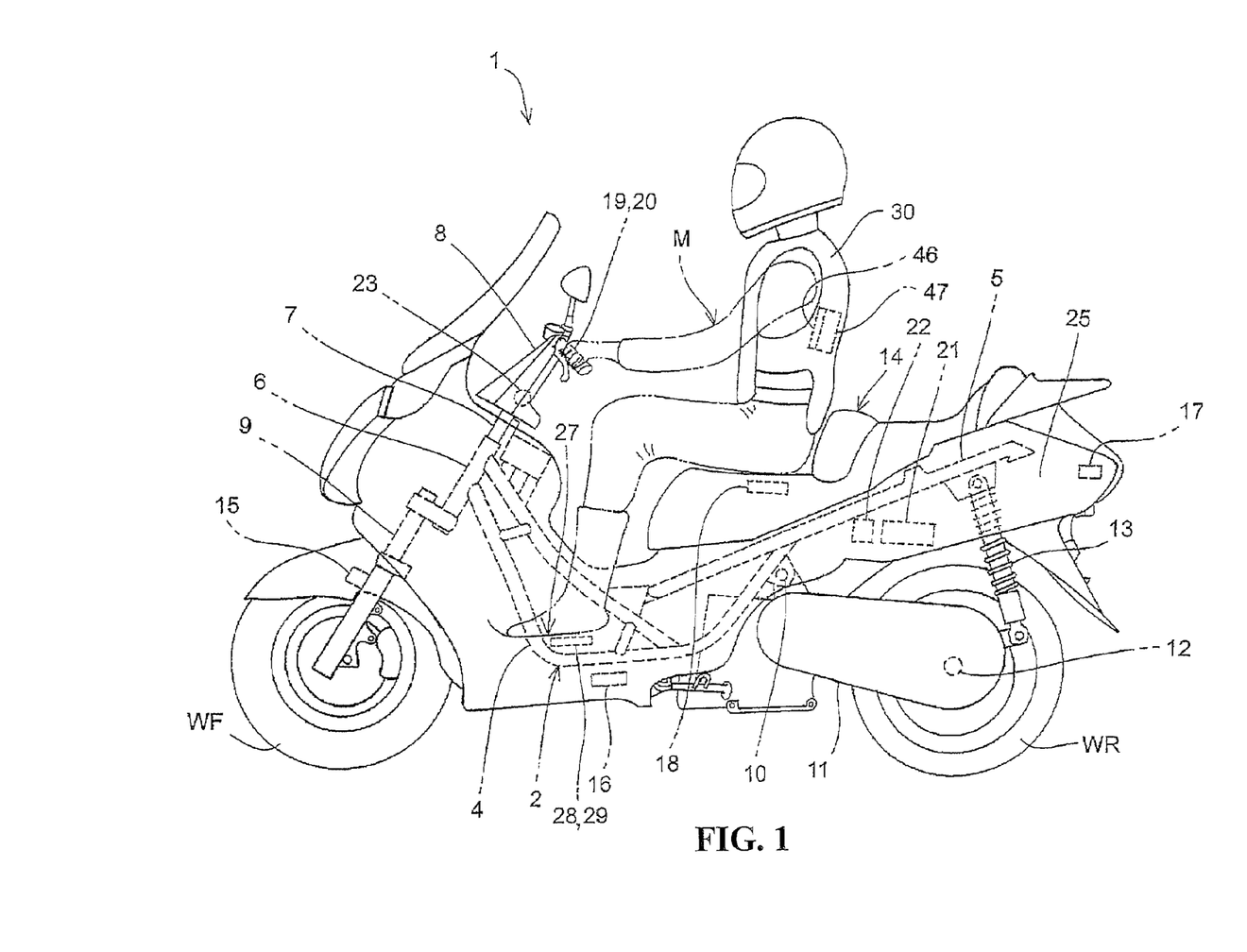
FIG. 1 is a left side view of a motorcycle according to an embodiment of the present invention.

Referring to the drawings, descriptions will be hereinbelow provided for a preferable embodiment of the present invention. FIG. 1 is a left side view of a motorcycle 1 according to an embodiment of the present invention. An airbag jacket activating system is applied to an airbag jacket 30 which a rider M wears and a motorcycle 1. A head pipe 6 for supporting a steering stem (not illustrated) pivotally and rotatably is disposed in a front portion of a vehicle body frame 2 of the motorcycle 1. A handlebar 8 is attached to an upper portion of the steering stem, and front forks 9 for supporting a front wheel WF are connected to a lower portion of the steering stem. A swing unit 11 is supported swingably upward and downward by an axle 10 in the rear of the vehicle body frame 2.

The swing unit 11, inclusive of an engine, a transmission and a decelerator, is hung from a rear frame 5, which is connected to the rear portion of the vehicle body frame 2, by a rear shock absorber unit 13. As a driving wheel, a rear wheel WR is fixed to an output shaft 12 of the swing unit 11. The left and right in a vehicle widthwise direction of the rear frame 5 are covered with a seat cowl 25. A seat 14 is disposed in an upper portion of the seat cowl 25. An on-vehicle ECU 21 as a control unit and an on-vehicle battery 22 are disposed under the rear frame 5.

The airbag jacket 30 includes multiple airbags (inflation air chambers) connected together in the form of a jacket; and an inflator for introducing a gas into the airbags. The airbag jacket 30 is inflated and thus deployed by igniting the inflator.

An acceleration sensor 15 for detecting an external force as a condition for activating the airbag jacket 30 is provided in front of the front forks 9. In this embodiment, similar acceleration sensors 16 are disposed in the respective two sides of the vehicle body, and a similar accelerations sensor 17 is disposed in the rear portion of the vehicle body. The acceleration sensors 16 are respectively attached to lower tubes 4 included in the vehicle body frame 2, and the acceleration sensor 17 is contained in a tail lamp system in the rear portion of the vehicle body. The outputs from the acceleration sensors 15, 16, 17 are inputted into the on-vehicle ECU 21, and are used for a judgment on whether to activate the airbag jacket 30. In addition, the number of acceleration sensors and the disposition locations of the acceleration sensors may be changed variously.

The airbag jacket activating system according to this embodiment is configured in that: radio communications transceivers are respectively provided to the on-vehicle ECU 21 and an in jacket ECU 40, which will be described later.

Thereby, an airbag jacket activation signal (hereinafter sometimes referred to as an "activation signal") is capable of being transmitted through radio communications. The airbag jacket activating system according to this embodiment is further configured in that "human body communications" is employed in which information is transmitted using the body, namely, the human body of the rider M as a transmission path. Thereby, the airbag jacket activation signal is capable of being transmitted using the radio communications and the human body communications in parallel.

Roughly speaking, the human body communication technology includes two familiar types an electric current type causing an electric current to flow in the human body and an electric field type giving a signal electric field to the human body. The following descriptions will be provided on the basis of the electric field type which enables communications through the same human body, and communications with an electrode for a transceiver attached to the clothing.

For the purpose of making the above-described human body communications feasible, the vehicle body of the motorcycle 1 includes multiple electrodes for transmitting the airbag jacket activation signal transmitted from the on-vehicle ECU 21, as the signal electric field, to the human body. In this embodiment, the multiple electrodes are provided in 5 locations in total a right handlebar portion electrode 19 and a left handlebar portion electrode 20 respectively built in the right and left handlebar grip portions to be gripped by the rider M; a seat portion electrode 18 built in the seat 14 on which the rider M is seated; a right footrest portion electrode 28 and a left footrest portion electrode 29 built in the respective footrest portions 27 on which the rider M puts the feet. The multiple electrodes are configured in that the human body communications is feasible as long as the rider is touching an electrode in at least one location.

The above-mentioned 5 locations are usually portions of the motorcycle 1 which the rider is always touching while driving, and are set so that the human body communications environment can be secured even when the acceleration sensors detect an external force which exceeds a predetermined value. In addition, the electrodes may be disposed in arbitrary locations which enable the rider and the electrodes to be arranged closer to each other. The number of disposed electrodes is not limited to the number in the embodiment, and may be set arbitrarily.

On the other hand, an in-jacket electrode 46 and a human body communications receiver 47 are built in the airbag jacket 30. With the above-described configuration, the airbag jacket activating system is configured in that once at least one of the acceleration sensors 15, 16, 17 detects the input of an external force which exceeds the predetermined value into the vehicle body, the airbag jacket activation signal is given, as the signal electric field, to the human body of the rider M through at least one of the right handlebar portion electrode 19, the left handlebar portion electrode 20, the seat portion electrode 18, the right footrest portion electrode 28 and the left footrest portions electrode 29. Subsequently, once this signal electric field is received by the human body communications receiver 47 through the in-jacket electrode 46, the airbag jacket 30 is activated.

Note that on-vehicle alarming means 23 configured to inform the rider M of troubles and the like in various devices provided in the vehicle body and the jacket is disposed in the vicinity of the handlebar 8 of the motorcycle 1. A lamp, a buzzer, a liquid crystal display and the like may be used for this on-vehicle alarming means 23.

Figure 2:
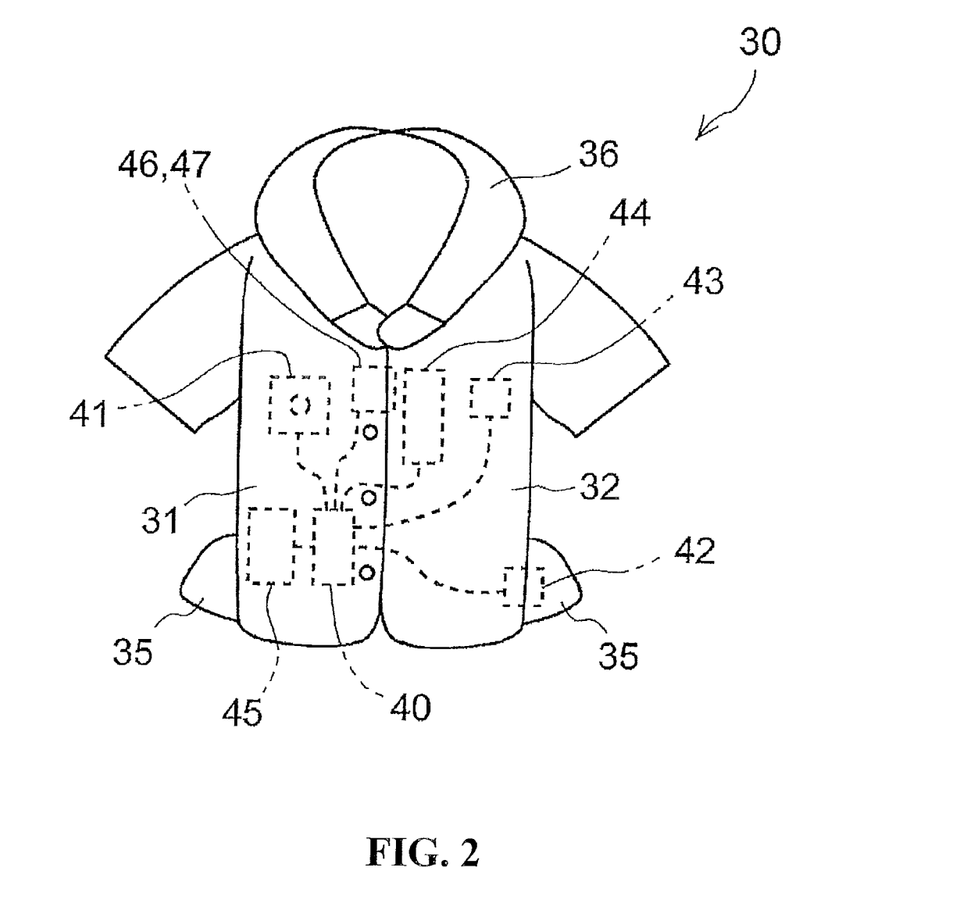
FIG. 2 is a front view of an airbag jacket.
Figure 3:
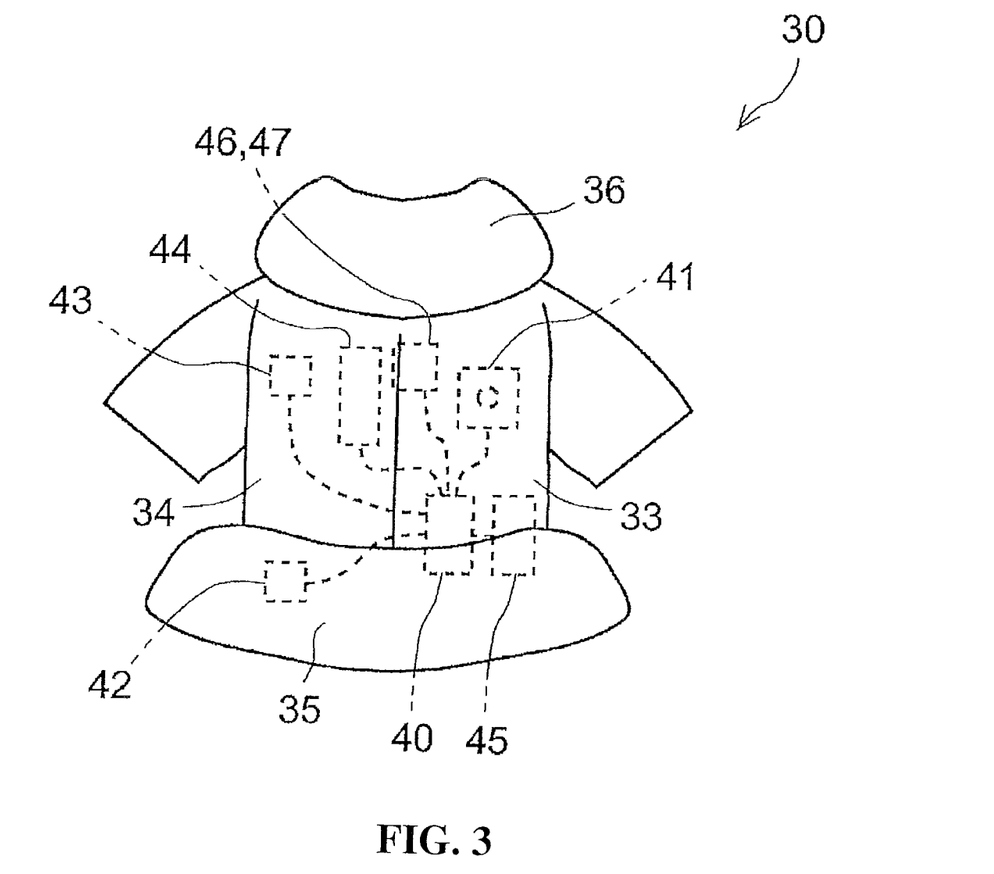
FIG. 3 is a rear view of the airbag jacket.

FIG. 2 is a front view of the airbag jacket 30 and FIG. 3 is a rear view thereof. The airbag jacket 30 includes the divided inflation air chambers respectively in a right front part 31, a left front part 32, a right rear part 33, a left rear part 34, a waist part 35 and a collar part 36. Each inflation air chamber is connected to an inflator 44 for supplying a gas for the inflation. The inflator 44 includes a carbon dioxide gas container and an activation device for breaking a seal of the carbon dioxide gas container.

The in-jacket ECU 40 for controlling the inflator 44, an in-jacket battery 42 for supplying a driving electric power to the in jacket ECU 40, an in-jacket radio communications transceiver 45 for enabling radio communications with the on-vehicle ECU 21 of the motorcycle 1, and a main switch 41 are attached to the airbag jacket 30. The airbag jacket 30 is further provided with in-jacket alarming means 43 configured to inform the rider of abnormalities in parts attached to the airbag jacket 30 and an abnormality in the action of the rider by use of sounds, vibrations and the like. The above-mentioned parts can be fixed to the airbag jacket 30 by sewing them to the airbag jacket 30 directly or containing them in the respective pocket-shaped containing portions (not illustrated).

Figure 4:
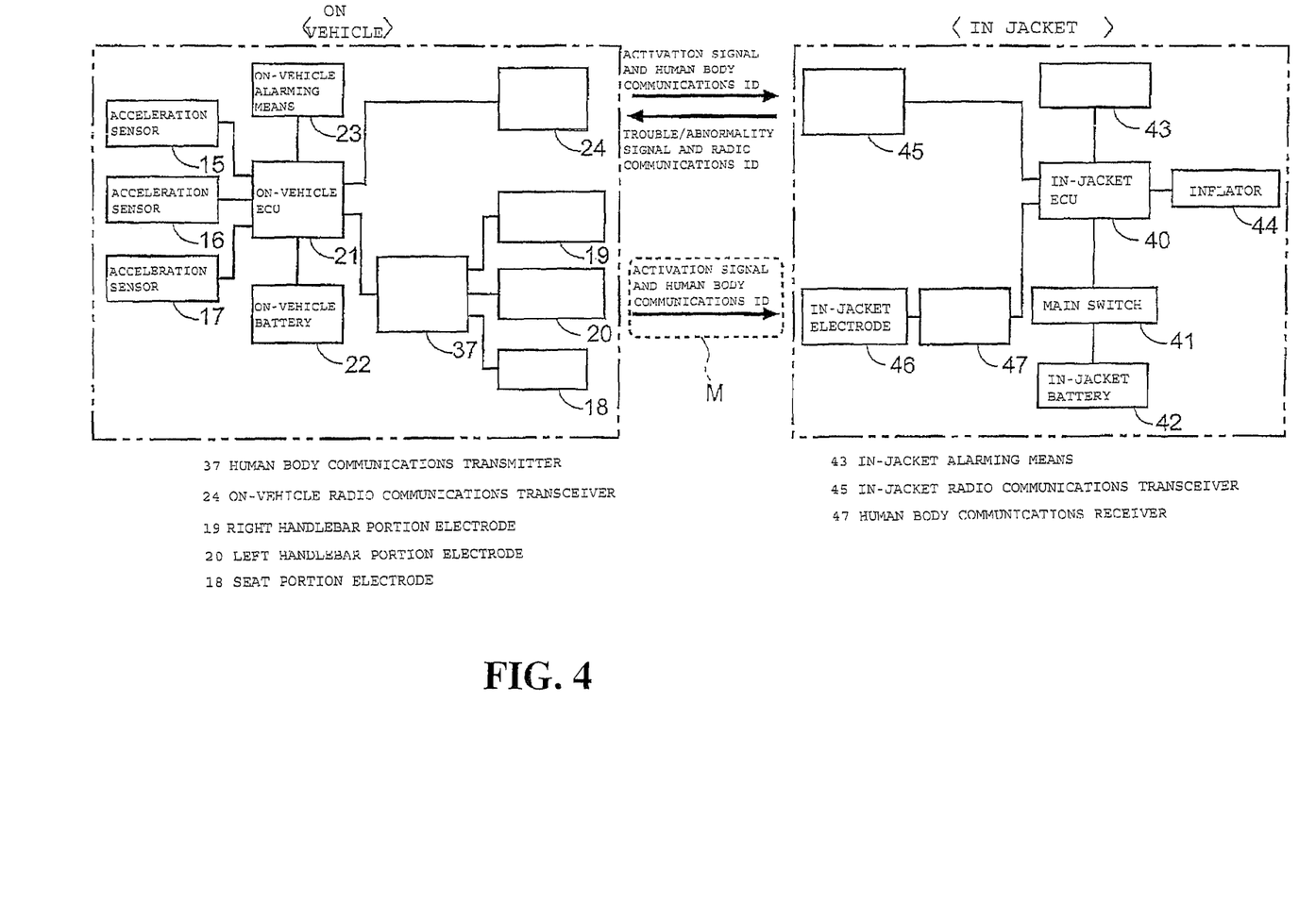
FIG. 4 is a block diagram showing an overall configuration of an airbag jacket activating system.

FIG. 4 is a block diagram showing an overall configuration of the airbag jacket activating system. The same reference numerals denote the same or similar parts. The acceleration sensors 15, 16, 17, the on-vehicle alarming means 23, the on-vehicle battery 22 for supplying a driving power supply to various devices, an on-vehicle radio communications transceiver 24 as a radio communication instrument, and a human body communications transmitter 37 are connected to the on-vehicle ECU 21. The right handlebar portion electrode 19, the left handlebar portion electrode 20, the seat portion electrode 18 are connected to the human body communications transmitter 37. Although not illustrated, the right footrest portion electrode 28 and the left footrest portion electrode 29 (see FIG. 1) are also connected to the human body communications transmitter 37.

On the other hand, the inflator 44, the main switch 41, the in jacket battery 42 for supplying a driving power supply to various devices, the in-jacket radio communications transceiver 45, and the human body communications receiver 47 are connected to the in ECU 40. The in electrode 46 is connected to the human body communications receiver 47.

The on-vehicle ECU 21 judges that an external force which exceeds the predetermined value is inputted into the vehicle body, when a sensor signal which exceeds a predetermined value is inputted into the on-vehicle ECU 21 from at least one of the acceleration sensors 15, 16, 17. In conjunction with this judgment, the on-vehicle ECU 21 transmits the activation signal for the airbag jacket 30 through the on-vehicle radio communications transceiver 24 through radio communications, and concurrently transmits the activation signal for the airbag jacket 30 through the human body communications transmitter 37 through human body communications.

Once receiving the activation signal for the airbag jacket 30 through the in-jacket radio communications transceiver 45, the in-jacket ECU 40 inflates and thus deploys the airbag jacket 30 by igniting the inflator 44. In addition, even in a case where the in-jacket ECU 40 receives no activation signal by radio communications, the in-jacket ECU 40 is configured to inflate and thus deploy the airbag jacket 30 by igniting the inflator 44 once receiving the activation signal for the airbag jacket 30 through the human body communications receiver 47.

The above-described configuration makes it possible to eliminate the wire between the vehicle body and the airbag jacket in exchange of the use of the radio communications, and to effectively transmit the activation signal through the human body communications using the human body of the rider M as the transmission path even in a case where the airbag jacket activation signal cannot be transmitted or received through the radio communications under an environment in which the communications condition is unsuitable for the radio communications.

The on-vehicle battery 22 serving as the power supply for the various devices on the vehicle body is charged by electric power from a power generator (not illustrated) to be rotated by an engine driving force of the motorcycle 1. On the other hand, the in-jacket battery 42 serving as the power supply for the various devices in the jacket decreases the amount of remaining power supply depending on the length of used time. The main switch 41 is used to turn on and off the power supply for the various devices for the purpose of preventing the in-jacket battery 42 from being consumed while the airbag jacket 30 is not in use.

Figure 5:
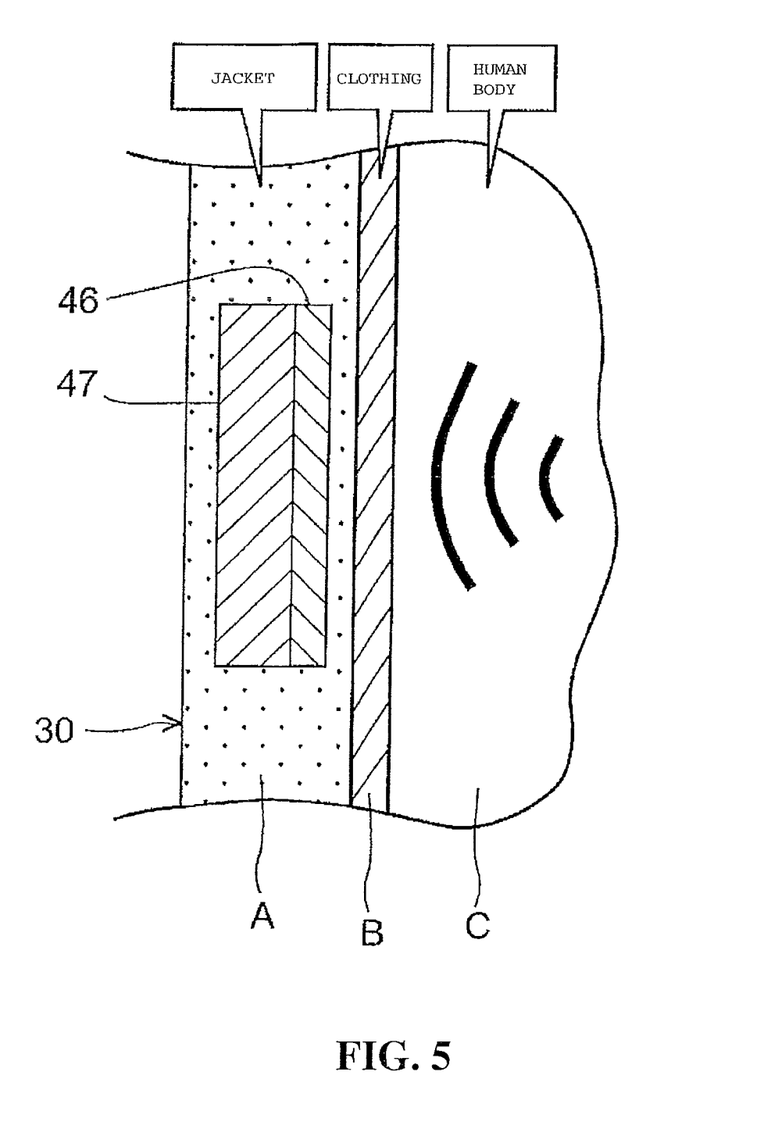
FIG. 5 is a schematic diagram showing an arrangement structure for an in-jacket electrode and a human body communications receiver.

FIG. 5 is a schematic diagram showing an arrangement structure for the in-jacket electrode 46 and the human body communications receiver 47. As described above, the electric field-type human body communications enables the communications even when the in-jacket electrode 46 does not touch the skin (the human body) directly, and makes it possible to secure a suitable communications environment even though the rider wears the airbag jacket 30 over the clothes B.

The electric field signal given to the human body C is transmitted to the in-jacket electrode 46 while penetrating the clothes B as well as the front cloth, filling and the like of the jacket A. Similarly, the electric field signal given through the on-vehicle electrodes 18, 19, 20 is imparted to the human body C while penetrating the clothing such as the gloves and the pants, as well as the pair of boots and the like. Note that the in-jacket electrode 46 and the human body communications receiver 47 may be formed as discrete bodies although integrally formed in this embodiment.

Figure 6:
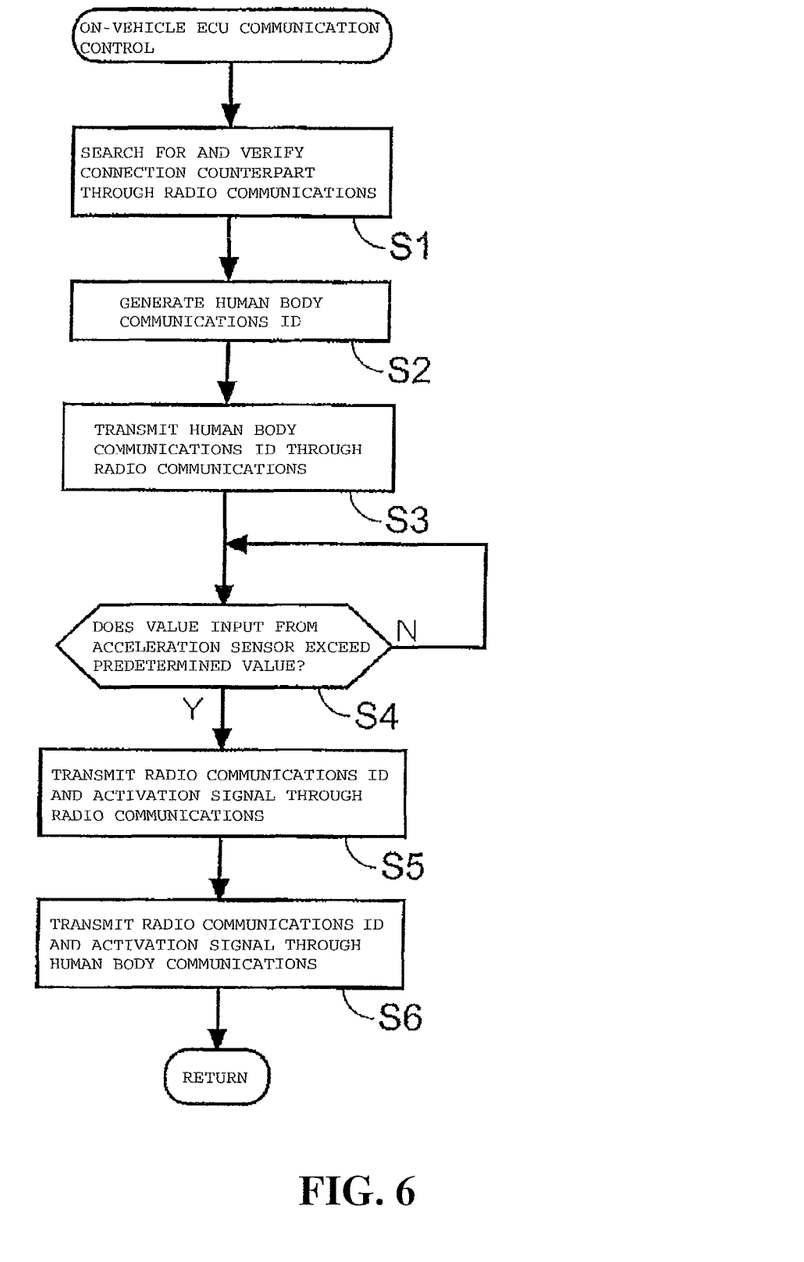
FIG. 6 is a flowchart showing a procedure of an on-vehicle ECU's communications control.

FIG. 6 is a flowchart showing a procedure of the on-vehicle ECU's communications control. This flowchart shows only the operation of the on-vehicle ECU 21. In step S1, the on-vehicle ECU 21 searches for and verifies its connection counterpart, namely, the predetermined airbag jacket 30 through radio communications. Once the verification of the airbag jacket 30 is completed in step S1, a human body communications ID (identification code) is generated by the on-vehicle ECU 21 in step S2.

In step S3, the human body communications ID is transmitted through radio communications. In step S4, it is judged whether or not any one of the acceleration sensor input values exceeds the predetermined value, that is to say, whether or not an external force which exceeds the predetermined value is inputted in the vehicle body. If an affirmative judgment is made in step S4, the process proceeds to step S5. If a negative judgment is made in step S4, the process returns to the judgment in step S4.

In step S5, the radio communications ID and the airbag jacket activation signal are transmitted through radio communications. Subsequently, in step S6, the human body communications ID and the airbag jacket activation signal are transmitted through human body communications, whereby the series of controls are completed.

Figure 7:
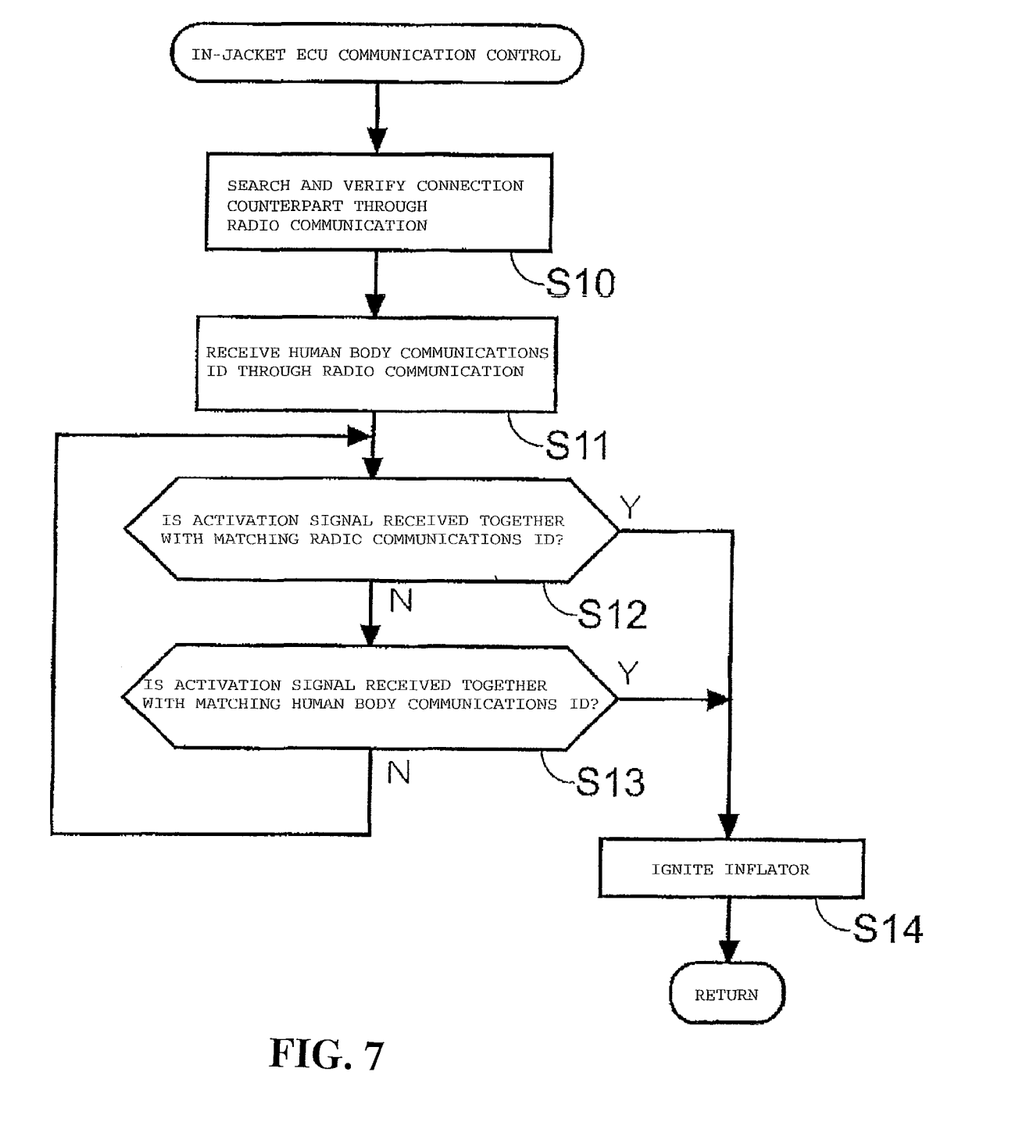
FIG. 7 is a flowchart showing a procedure of an in ECU's communications control.

FIG. 7 is a flowchart showing a procedure of the in-jacket ECU's communications control. This flowchart shows only the operation of the in-jacket ECU 40. In step S10, the in-jacket ECU 40 searches for and verifies its connection counterpart, namely, the predetermined motorcycle 1 through radio communications. Once the verification of the motorcycle 1 is completed in step S10, the human body communications ID transmitted by the on-vehicle ECU 21 is received through radio communications.

Subsequently, in step S12, it is judged whether or not the airbag jacket activation signal is received together with the matching radio communications ID through radio communications. If an affirmative judgment is made in step S12, the process proceeds to step S14, where the inflator 44 is ignited.

On the other hand, if a negative judgment is made in step S12, the process proceeds to step S13, where it is judged whether or not the airbag jacket activation signal is received together with the matching human body communications ID through human body communications. If an affirmative judgment is made in step S13, the process proceeds to step S14, where the inflator 44 is ignited. On the other hand, if a negative judgment is made in step S13, the process returns to the judgment in step S12.

The foregoing configuration carries out the transmission of the activation signal through radio communications and the transmission of the activation signal through human body communications in parallel, and thereby makes it possible to activate the airbag jacket 30 by transmitting the activation signal through the human body communications even under an environment in which the communications condition is unsuitable for the radio communications. In addition, as shown in steps S12, S13, in the case where the reception of the activation signal through the radio communications succeeds, the inflator is ignited without waiting for the activation signal to be received through the human body communications. This makes it possible to give priority to the radio communications for which the ID and the like are coded, and to instantaneously deploy the airbag jacket, as well as to enhance the security quality.

It should be noted that the setting of the condition for activating the airbag jacket may be changed variously. For example, the reception of both the activation signal through the radio communications and the activation signal through the human body communications may be used as the condition for the activation unlike in the foregoing embodiment in which the airbag jacket is set to be activated once the activation signal is received through either the radio communications or the human body communications.

The shapes and structures of the motorcycle, airbag jacket, inflator and battery, the structures and dispositions of the on-vehicle electrodes and in-jacket electrode, the dispositions of the on-vehicle ECU and in-jacket ECU, the dispositions of the acceleration sensors, the transmission method for the human body communications, and the setting method for the ID may be changed variously while not limited to those in the foregoing embodiment. The airbag jacket activating system according to the present invention can be applied to various types of vehicles such as three-wheel cars and four-wheel cars in addition to motorcycles, as well as various types of airbag jackets.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An airbag jacket activating system includes an acceleration sensor, an on-vehicle ECU, and an on-vehicle radio communications instrument which are provided in a vehicle body and an in-jacket radio communications instrument and an in-jacket ECU which are provided in an airbag jacket, the acceleration sensor being configured to detect acceleration applied to the vehicle body, the on-vehicle ECU is configured to output an activation signal for the airbag jacket on a basis of an output signal from the acceleration sensor, the on-vehicle radio communications instrument is configured to transmit the activation signal through radio communications on a basis of the output signal from the on-vehicle ECU, the in-jacket radio communications instrument is configured to receive the activation signal through radio communications, the in-jacket ECU is configured to inflate and thus deploy the airbag jacket on a basis of the activation signal, the airbag jacket activating system comprising:

a human body communications transmitter, provided on the vehicle body, for transmitting the activation signal by using the human body of a rider as a transmission path on a basis of an instruction from the on-vehicle ECU; and a human body communications receiver, provided on the airbag jacket, for receiving the activation signal which is transmitted by using the human body of the rider as the transmission path;

wherein the in-jacket ECU is configured to inflate and thus deploy the airbag jacket upon receipt of the activation signal through communications of the human body communications transmitter or the human body communications receiver.

2. The airbag jacket activating system according to claim 1, wherein the human body communications transmitter is connected to an on-vehicle electrode for giving an electric field signal to the human body of the rider (M), and the human body communications receiver is connected to an in-jacket electrode for detecting the electric field signal which is given to the human body of the rider by the human body communications transmitter.

3. The airbag jacket activating system according to claim 2, wherein the human body communications transmitter is attached to a vehicle body of a motorcycle, and the on-vehicle electrode is provided to left and right handlebar grip portions at which a handlebar of the vehicle body is gripped.

4. The airbag jacket activating system according to claim 2, wherein the human body communications transmitter is attached to the vehicle body of a motorcycle, and the on-vehicle electrode is provided to a seat of the vehicle body.

5. The airbag jacket activating system according to claim 3, wherein the human body communications transmitter is attached to the vehicle body of the motorcycle, and the on-vehicle electrode is provided to a seat of the vehicle body.

6. The airbag jacket activating system according to claim 2, wherein the human body communications transmitter is attached to the vehicle body of a motorcycle, and the on-vehicle electrode is provided to respective a footrest portion of the vehicle body.

7. The airbag jacket activating system according to claim 4, wherein the human body communications transmitter is attached to the vehicle body of a motorcycle, and the on-vehicle electrode is provided to respective a footrest portion of the vehicle body.

8. The airbag jacket activating system according to claim 2, wherein the human body communications receiver and the in-jacket electrode are formed integrally within the airbag jacket.

9. The airbag jacket activating system according to claim 2, wherein the acceleration sensor includes a plurality of sensors and the on-vehicle ECU judges if an external force which exceeds a predetermined value is inputted into the vehicle body from at least one of the acceleration sensors to generate a signal exceeding a predetermined value that is inputted into the on-vehicle ECU for transmitting the activation signal.

10. The airbag jacket activating system according to claim 9, wherein the transmission of the activation signal through radio communications and the transmission of the activation signal through communications of the human body communications transmitter and the human body communications receiver are in parallel to enable the activation of the airbag jacket by transmitting the activation signal through the communications of the human body communications transmitter and the human body communications receiver even in an environment wherein communications conditions are unsuitable for radio communications.

11. An airbag jacket activating system comprising:

an acceleration sensor;

an on-vehicle ECU;

an on-vehicle radio communications instrument provided in a vehicle body;

an in-jacket radio communications instrument;

an in ECU provided in an airbag jacket;

wherein the acceleration sensor detects acceleration applied to the vehicle body, the on-vehicle ECU outputs an activation signal for the airbag jacket on a basis of an output signal from the acceleration sensor, the on-vehicle radio communications instrument transmits the activation signal through radio communications on a basis of the output signal from the on-vehicle ECU, the in-jacket radio communications instrument receives the activation signal through radio communications, the in jacket ECU inflates and thus deploys the airbag jacket on a basis of the activation signal;

said airbag jacket activating system comprising:

a human body communications transmitter operatively connected to the vehicle body for transmitting the activation signal on a basis of an instruction from the on-vehicle ECU; and a human body communications receiver operatively connected to the airbag jacket for receiving the activation signal;

wherein the in-jacket ECU is configured to inflate and thus deploy the airbag jacket upon receipt of the activation signal through communications of the human body communications transmitter or the human body communications receiver.

12. The airbag jacket activating system according to claim 11, wherein the human body communications transmitter is connected to an on-vehicle electrode for giving an electric field signal to the human body of the rider (M), and the human body communications receiver is connected to an in-jacket electrode for detecting the electric field signal which is given by the human body communications transmitter.

13. The airbag jacket activating system according to claim 12, wherein the human body communications transmitter is attached to a vehicle body of a motorcycle, and the on-vehicle electrode is provided to left and right handlebar grip portions at which a handlebar of the vehicle body is gripped.

14. The airbag jacket activating system according to claim 13, wherein the human body communications transmitter is attached to the vehicle body of the motorcycle, and the on-vehicle electrode is provided to a seat of the vehicle body.

15. The airbag jacket activating system according to claim 12, wherein the human body communications transmitter is attached to the vehicle body of a motorcycle, and the on-vehicle electrode is provided to a seat of the vehicle body.

16. The airbag jacket activating system according to claim 15, wherein the human body communications transmitter is attached to the vehicle body of a motorcycle, and
the on-vehicle electrode is provided to respective a footrest portion of the vehicle body.

17. The airbag jacket activating system according to claim 12, wherein the human body communications transmitter is attached to the vehicle body of a motorcycle, and
the on-vehicle electrode is provided to respective a footrest portion of the vehicle body.

18. The airbag jacket activating system according to claim 12, wherein the human body communications receiver and the in-jacket electrode are formed integrally within the airbag jacket.

19. The airbag jacket activating system according to claim 12, wherein the acceleration sensor includes a plurality of sensors and the on-vehicle ECU judges if an external force which exceeds a predetermined value is inputted into the vehicle body from at least one of the acceleration sensors to generate a signal exceeding a predetermined value that is inputted into the on-vehicle ECU for transmitting the activation signal.

20. The airbag jacket activating system according to claim 19, wherein the transmission of the activation signal through radio communications and the transmission of the activation signal through communications of the human body communications transmitter and the human body communications receiver are in parallel to enable the activation of the airbag jacket by transmitting the activation signal through the communications of the human body communications transmitter and the human body communications receiver even in an environment wherein communications conditions are unsuitable for radio communications.

* * * * *